United States Patent
Rajagopalan et al.

(10) Patent No.: US 12,339,955 B2
(45) Date of Patent: Jun. 24, 2025

(54) END-TO-END DISTRIBUTED RECOVERY OF A USER COMPUTING DEVICE ON WHICH SECURE WORKSPACES ARE DEPLOYED

(71) Applicant: Dell Products L.P., Round Rock, TX (US)

(72) Inventors: Srinivasa Ragavan Rajagopalan, Bangalore (IN); Gokul Thiruchengode Vajravel, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 18/051,655

(22) Filed: Nov. 1, 2022

(65) Prior Publication Data

US 2024/0143738 A1  May 2, 2024

(51) Int. Cl.
*H04L 29/06* (2006.01)
*G06F 21/00* (2013.01)
*G06F 21/54* (2013.01)

(52) U.S. Cl.
CPC ........ *G06F 21/54* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,881,311 A * | 3/1999 | Woods | G06F 3/064 |
| | | | 714/E11.119 |
| 6,545,660 B1 * | 4/2003 | Shen | G06F 3/048 |
| | | | 345/173 |
| 7,603,395 B1 * | 10/2009 | Bingham | G06F 16/184 |
| 7,765,190 B1 * | 7/2010 | Bingham | G06F 11/1458 |
| | | | 707/649 |
| 11,086,545 B1 * | 8/2021 | Dayal | G06F 3/067 |
| 2002/0083156 A1 * | 6/2002 | Wysoczynski | G06F 11/1433 |
| | | | 709/219 |
| 2009/0271581 A1 * | 10/2009 | Hinrichs, Jr. | G06F 11/1441 |
| | | | 711/E12.103 |
| 2012/0150809 A1 * | 6/2012 | Parikh | G06F 11/1458 |
| | | | 707/E17.007 |
| 2016/0117810 A1 * | 4/2016 | Berry | H04L 41/22 |
| | | | 715/738 |
| 2019/0370123 A1 * | 12/2019 | Heckel | G06F 11/1484 |
| 2020/0159625 A1 * | 5/2020 | Hutcheson | G06F 11/1461 |
| 2021/0064243 A1 * | 3/2021 | Loce | G06F 12/0615 |
| 2021/0390022 A1 * | 12/2021 | Siluvainathan | G06F 3/0607 |

* cited by examiner

*Primary Examiner* — Lisa C Lewis
(74) *Attorney, Agent, or Firm* — Kirton McConkie; Brian Tucker

(57) ABSTRACT

End-to-end distributed recovery of a user computing device on which secure workspaces are deployed is provided. An image of a user computing device and images of secure workspaces deployed on the user computing device can be created and stored. In response to a crash of the user computing device, a combined image can be created from the image of the user computing device and the images of the secure workspaces deployed on the user computing device. The combined image can then be deployed on the user computing device to recover the user computing device.

18 Claims, 13 Drawing Sheets

END-TO-END DISTRIBUTED RECOVERY OF A USER COMPUTING DEVICE ON WHICH SECURE WORKSPACES ARE DEPLOYED

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace, including native applications and applications hosted in other secure workspaces.

When a user computing device on which secure workspaces are deployed or the operating system on the user computing device (or base operating system) fail, it is a difficult, tedious, and oftentimes prolonged process to perform a complete recovery of the user computing device. For example, a complete recovery may entail repairing or replacing the user computing device if the user computing device has failed, recovering the base operating system, downloading and installing the components for supporting the deployment of secure workspaces on the user computing device, downloading and deploying the secure workspaces, and downloading and deploying any policies for configuring the secure workspaces or other components.

There are tools for recovering the base operating system, but the remaining steps would need to be performed manually. Such steps require technical know-how and therefore must typically be performed by an administrator. Even when an administrator is available to perform the steps, he or she must still devote the significant time to gather the necessary information for completing the steps and then complete them.

BRIEF SUMMARY

The present invention extends to systems, methods and computer program products for end-to-end distributed recovery of a user computing device on which secure workspaces are deployed. An image of a user computing device and images of secure workspaces deployed on the user computing device can be created and stored. In response to a crash of the user computing device, a combined image can be created from the image of the user computing device and the images of the secure workspaces deployed on the user computing device. The combined image can then be deployed on the user computing device to recover the user computing device.

In some embodiments, the present invention may be implemented as a method for end-to-end distributed recovery of a user computing device on which secure workspaces are deployed. An image of a user computing device on which secure workspaces are deployed can be created. Images of the secure workspaces can also be created. The image of the user computing device and the images of the secure workspace can be stored. In response to a crash of the user computing device, a combined image created from the image of the user computing device and the images of the secure workspace can be obtained. The combined image can be deployed to recover the user computing device including the secure workspaces.

In some embodiments, the present invention may be implemented as computer storage media storing computer executable instructions which when executed implement a method for end-to-end distributed recovery of a user computing device on which secure workspaces are deployed. A host agent running on a user computing device can create an image of the user computing device on which secure workspaces are deployed. Workspace agents running in the secure workspaces can create images of the secure workspaces. The host agent can provide the image of the user computing device and the images of the secure workspaces to a recovery image manager of a management solution. The recovery image manager can store the image of the user computing device and the images of the secure workspace in a recovery image repository. In response to a crash of the user computing device, a combined image created from the image of the user computing device and the images of the secure workspace can be obtained. The combined image can be deployed to recover the user computing device including the secure workspaces.

In some embodiments, the present invention may be implemented as a system that includes a management solution having a secure workspace orchestrator for deploying secure workspaces to user computing devices, a recovery image manager, and a recovery image repository. The system can also include user computing devices. Each user computing device may include a host agent and at least one secure workspace deployed on the user computing device. The host agent can be configured to provide an image of the respective user computing device and an image of each of the at least one secure workspace deployed on the respective user computing device to the recovery image manager for storage in the recovery image repository. In response to a crash of the respective user computing device, a combined image can be created from the image of the respective user computing device and the image of each of the at least one secure workspace deployed on the respective user computing device and deployed to recover the respective user computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
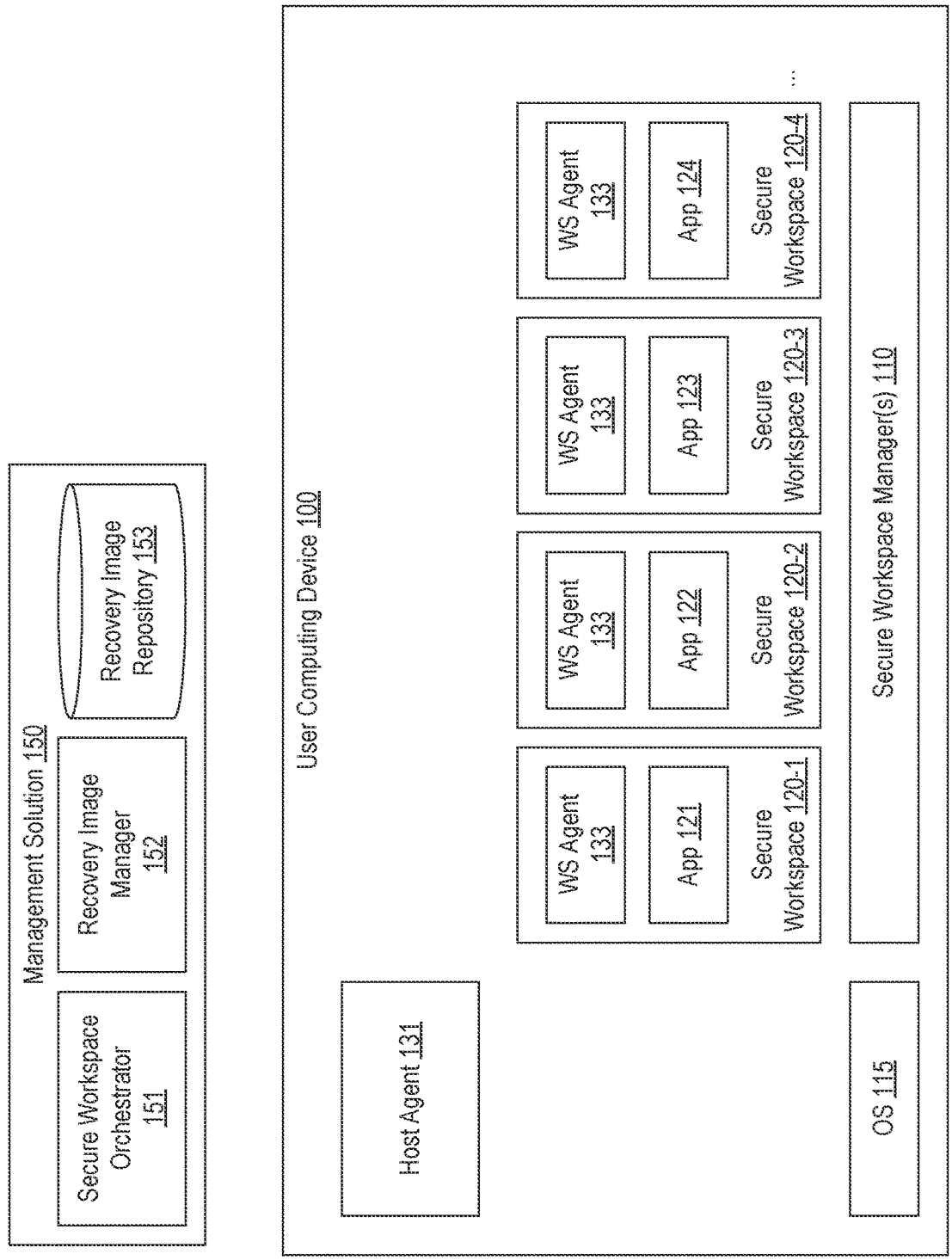
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management solution 150 which is used to manage user computing device 100. Although only a single user computing device 100 is shown, management solution 150 would typically be used to manage a large number of user computing devices, any or all of which could be configured in the same manner as user computing device 100 to thereby allow end-to-end distributed recovery of the user computing device in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that four secure workspaces 120-1 through 120-4 are deployed on user computing device 100. However, there could be any number and/or type of secure workspaces at any given time. These secure workspaces are represented as hosting applications 121, 122, 123, and 124 respectively. Notably, a secure workspace could include more than one application.

User computing device 100 also includes an operating system (OS) 115 which can be considered the base operating system to distinguish it from an operating system inside any of the secure workspaces (e.g., inside a virtual machine). Some or all the secure workspaces could run in the context of operating system 115 (e.g., when the secure workspace is a software container) and/or some or all the secure workspaces could run in separate virtual machines. User computing device also includes host agent 131 which can run in the context of operating system 115.

Host agent 131 can be configured to implement management services on user computing device 100 including the deployment and management of secure workspaces on user computing device 100. For example, a secure workspace orchestrator 151 on management solution 150 may interface with host agent 131 to provide secure workspaces (or at least information for creating secure workspaces), and host agent 131 may interface with secure workspace manager(s) 110 to create and manage the secure workspaces.

Each secure workspace can include a workspace agent 133 that is configured to interface with host agent 131 to facilitate end-to-end distributed recovery of user computing device 100 in accordance with embodiments of the present invention.

Management solution 150 may also include a recovery image manager 152 and a recovery image repository 153. As described in greater detail below, recovery image manager 152 can obtain images (or snapshots) of user computing device 100 and secure workspaces 120-1 through 120-4 and store the images in recovery image repository 153.

Figure 2A:
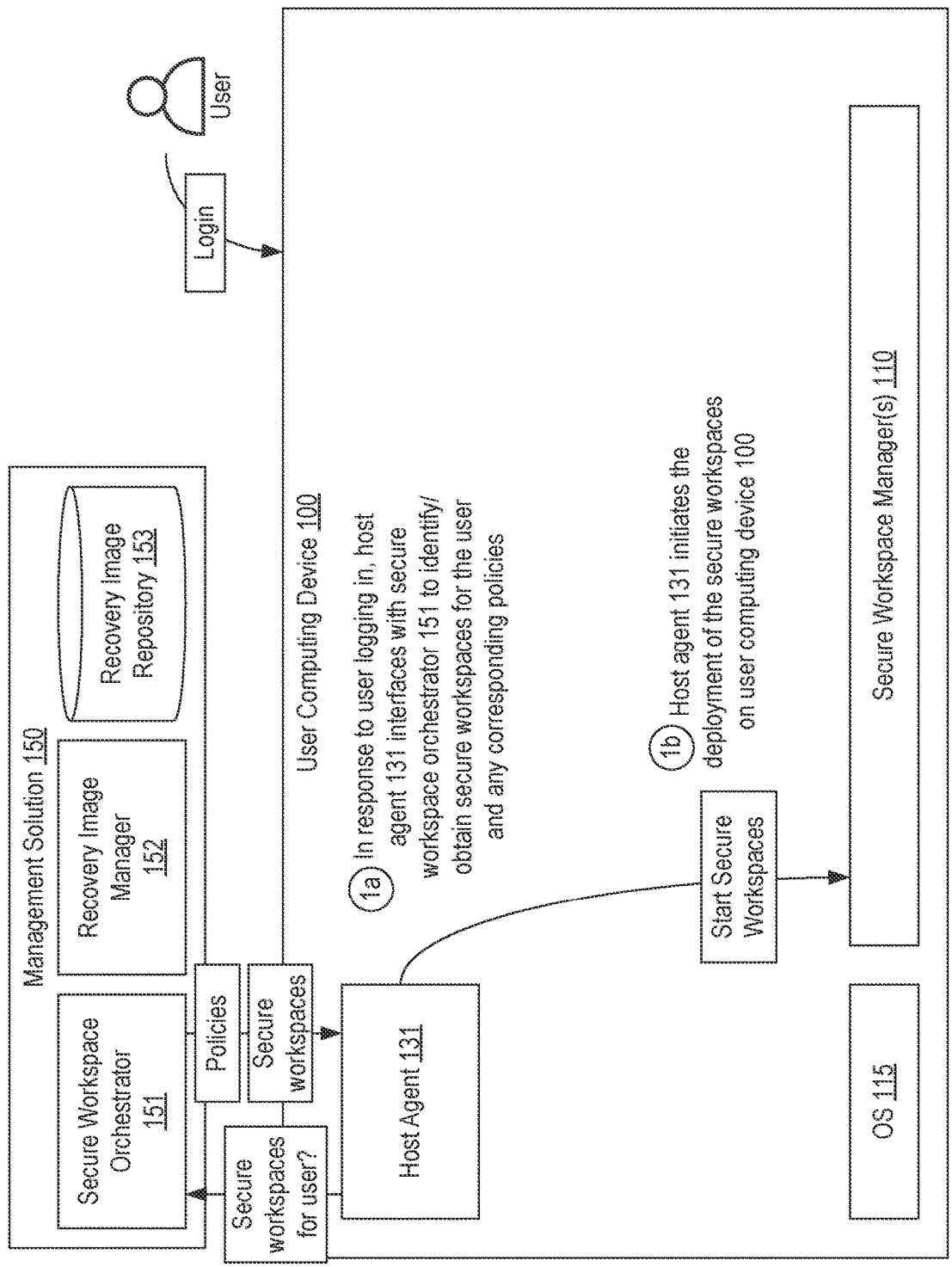
FIGS. 2A-2D provide an example of how a host agent and a workspace agent can create images to facilitate end-to-end distributed recovery of a user computing device on which secure workspaces are deployed in accordance with one or more embodiments of the present invention.

FIGS. 2A-2D provide an example of how host agent 131 and workspace agent 133 can create images to facilitate end-to-end distributed recovery of user computing device 100. Turning to FIG. 2A, in step 1a which may be performed in response to a user logging in to user computing device 100, host agent 131 can interface with secure workspace orchestrator 151 to identify or obtain secure workspaces for the user along with any policies applicable to the secure workspaces. For example, these policies could be user preferences, security settings, or other user-specific customization to user computing device 100 or any secure workspaces deployed or to be deployed on user computing device 100. In step 1b, host agent 131 can initiate the deployment of the secure workspaces on user computing device 100. In this example, it is assumed that secure workspaces 120-1, 120-2, 120-3, and 120-4 are provided to host agent 131 and therefore deployed on user computing device 100.

Figure 2B:
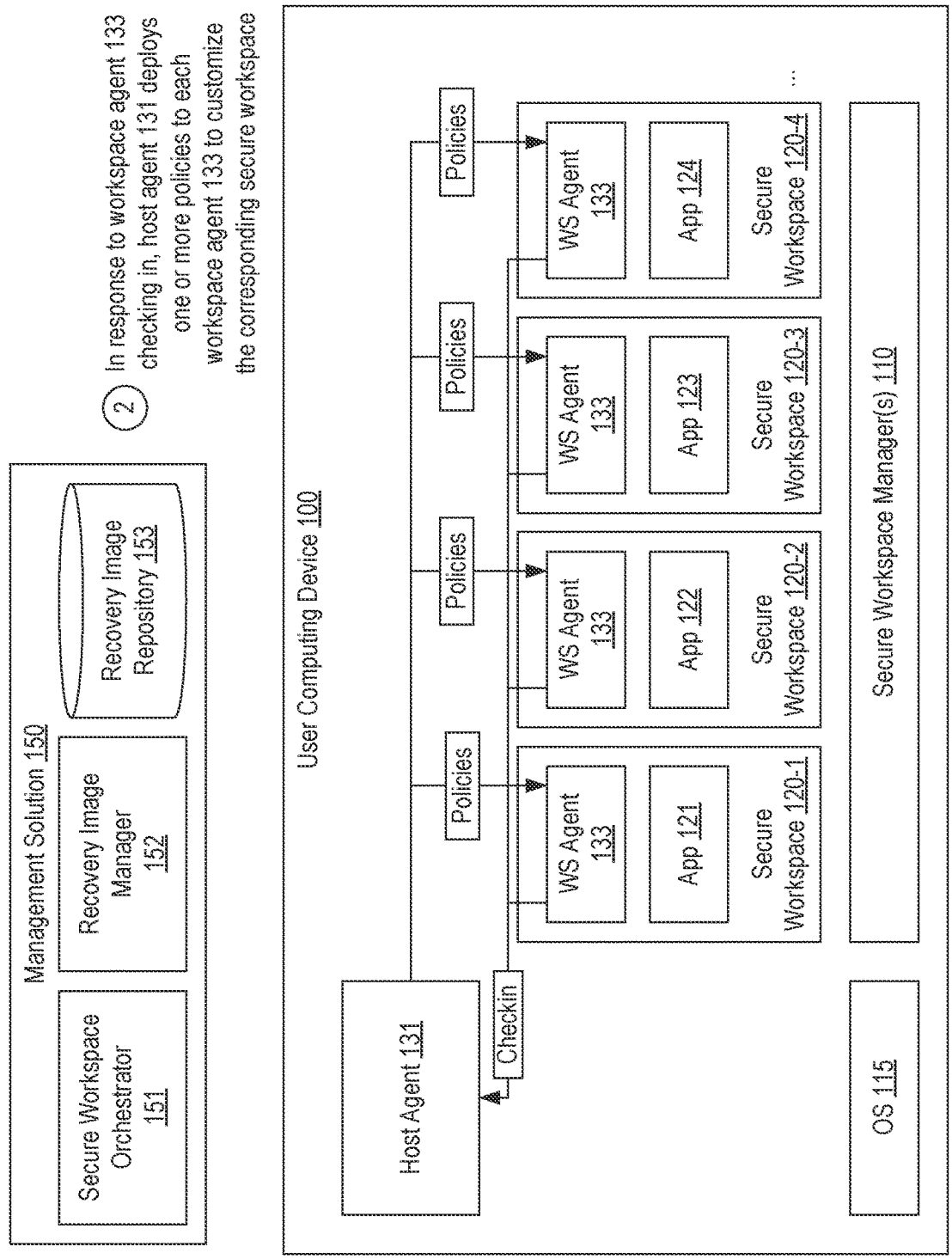

Turning to FIG. 2B, in step 2, the instance of workspace agent 133 may check in with host agent 131 (e.g., once the corresponding secure workspace is deployed) and in response, host agent 131 may provide the applicable policies to workspace agent 133 to allow workspace agent 133 to apply the policies within the respective secure workspace. For example, host agent 131 may provide policies to the instance of workspace agent 133 in secure workspace 120-1 for customizing application 121.

Figure 2C:
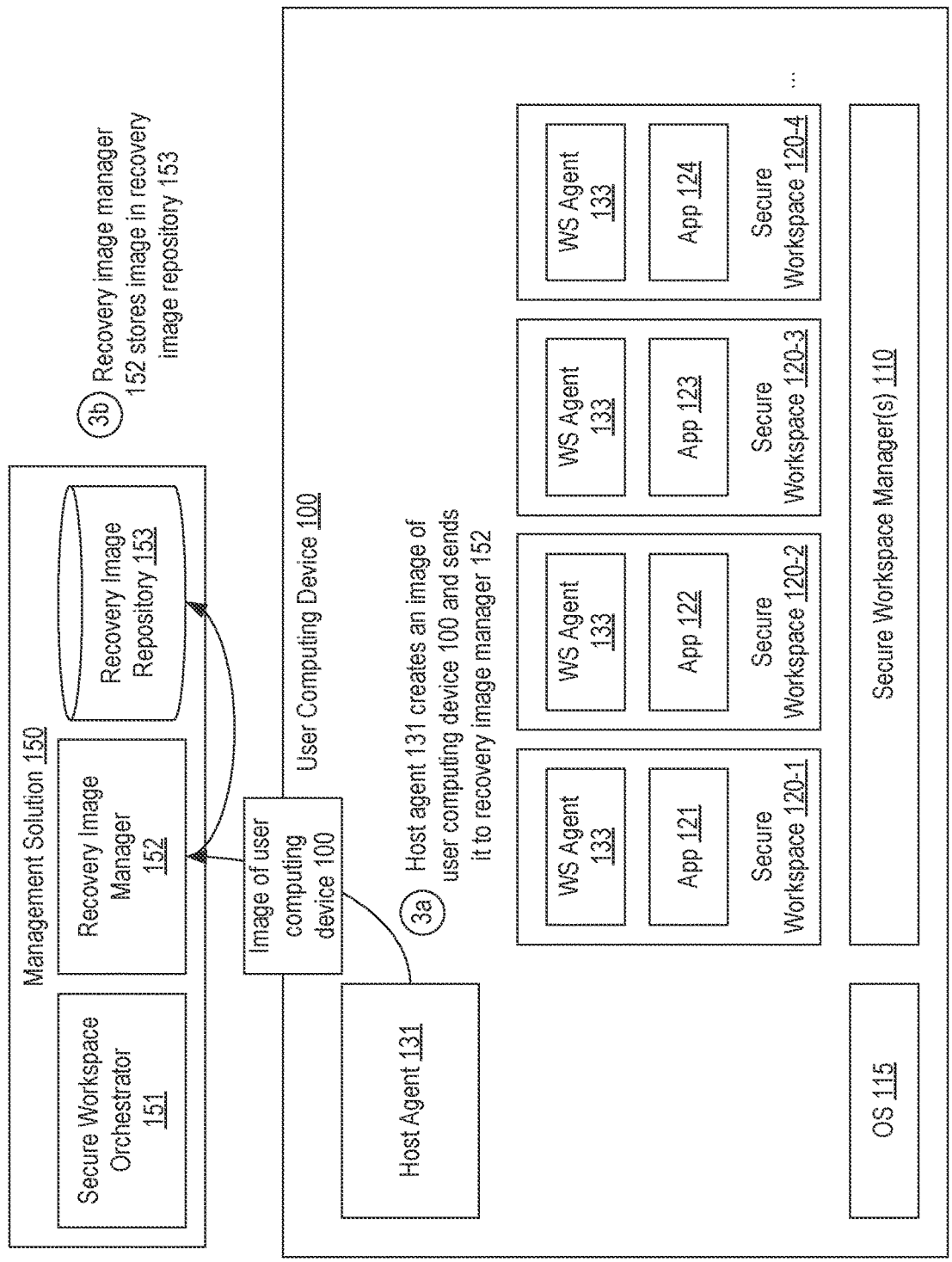

Turning to FIG. 2C, in step 3a, host agent 131 can create an image of user computing device 100 and send the image to recovery image manager 152. Then in step 3b, recovery image manager 152 may store the image in recovery image repository 153. This image of user computing device 100 may include operating system 115, host agent 131, and secure workspace manager(s) 110, among possibly other components. However, because host agent 131 does not have access to components within the secure workspaces, this image of user computing device 100 will not capture such components. Host agent 131 can be configured to create and upload an image of user computing device 100 on a periodic basis.

Figure 2D:
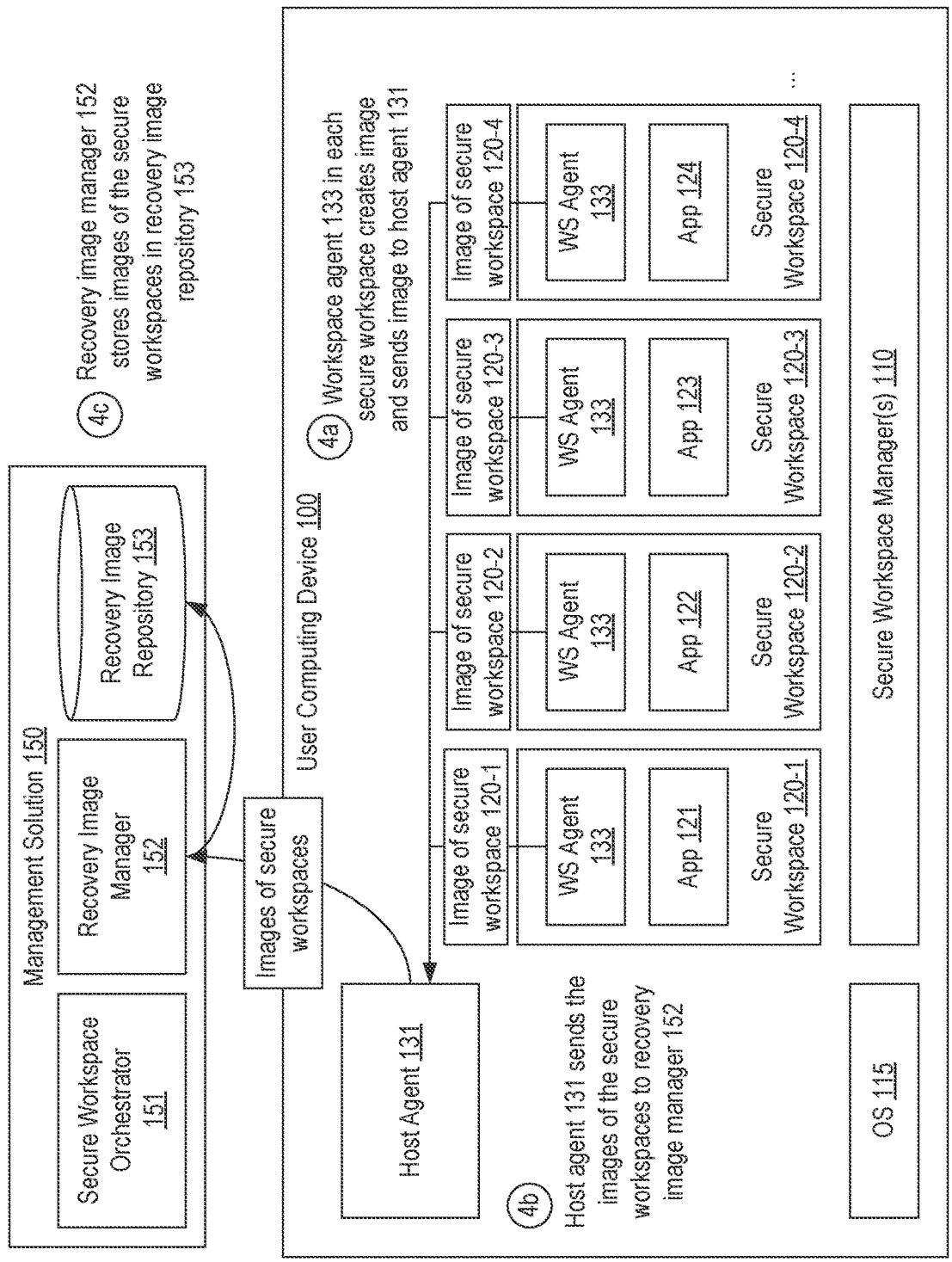

Turning to FIG. 2D, in step 4a which could be performed in response to a request from host agent 131, workspace agent 133 can create an image of the secure workspace within which it is running and provide the image to host agent 131. In step 4b, host agent 131 can send the images of the secure workspaces to recovery image manager 152. In step 4c, recovery image manager 152 can store the images of the secure workspaces in recovery image repository 153.

Figure 3:
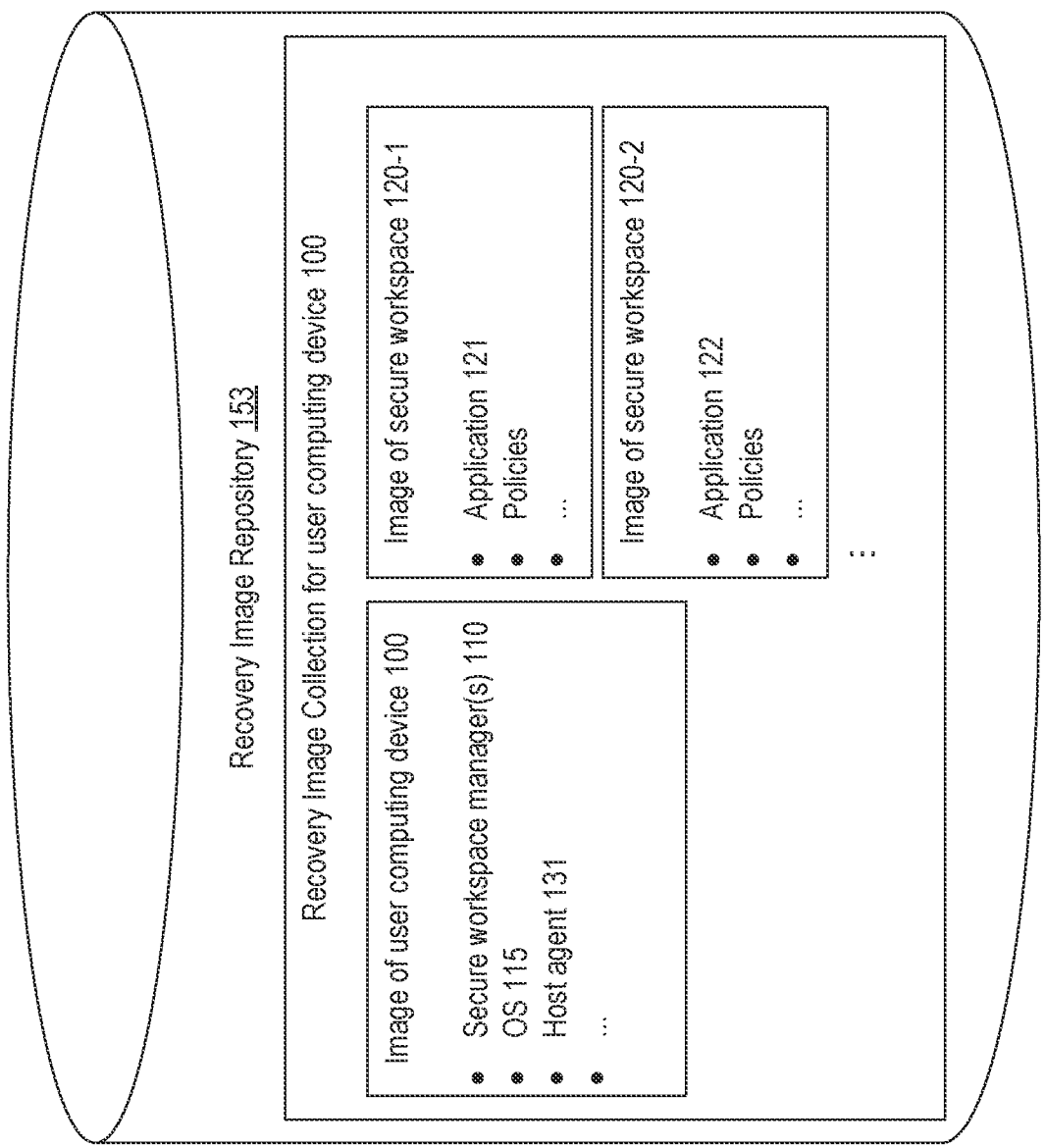
FIG. 3 provides an example of how images can be stored for a user computing device on which secure workspaces are deployed to facilitate end-to-end distributed recovery of the user computing device in accordance with one or more embodiments of the present invention.

FIG. 3 provides an example of how these images obtained from user computing device 100 may be stored in recovery image repository 153. As shown, the various images can be associated as a recovery image collection for user computing device (e.g., by associating each image with an identifier of user computing device and/or of the user). This recovery image collection can include the image of user computing device 100 containing operating system 115, secure workspace manager(s) 110, host agent 131, etc. and the image of each secure workspace containing any application hosted in the secure workspace, any policies applied within the secure workspace, etc. As host agent 131 provides new images to recovery image manager 152, recovery image manager 152 could store the new images in the recovery image collection possibly in place of existing images or in addition to existing images to provide multiple options for recovery. Although not shown, there may be recovery image collections in recovery image repository 153 for many other user computing devices.

FIGS. 4A-4E provide an example of how end-to-end distributed recovery of a user computing device on which secure workspaces are deployed can be performed in accordance with one or more embodiments of the present invention. This example is based on and continues the example of FIGS. 2A-2D.

Figure 4A:
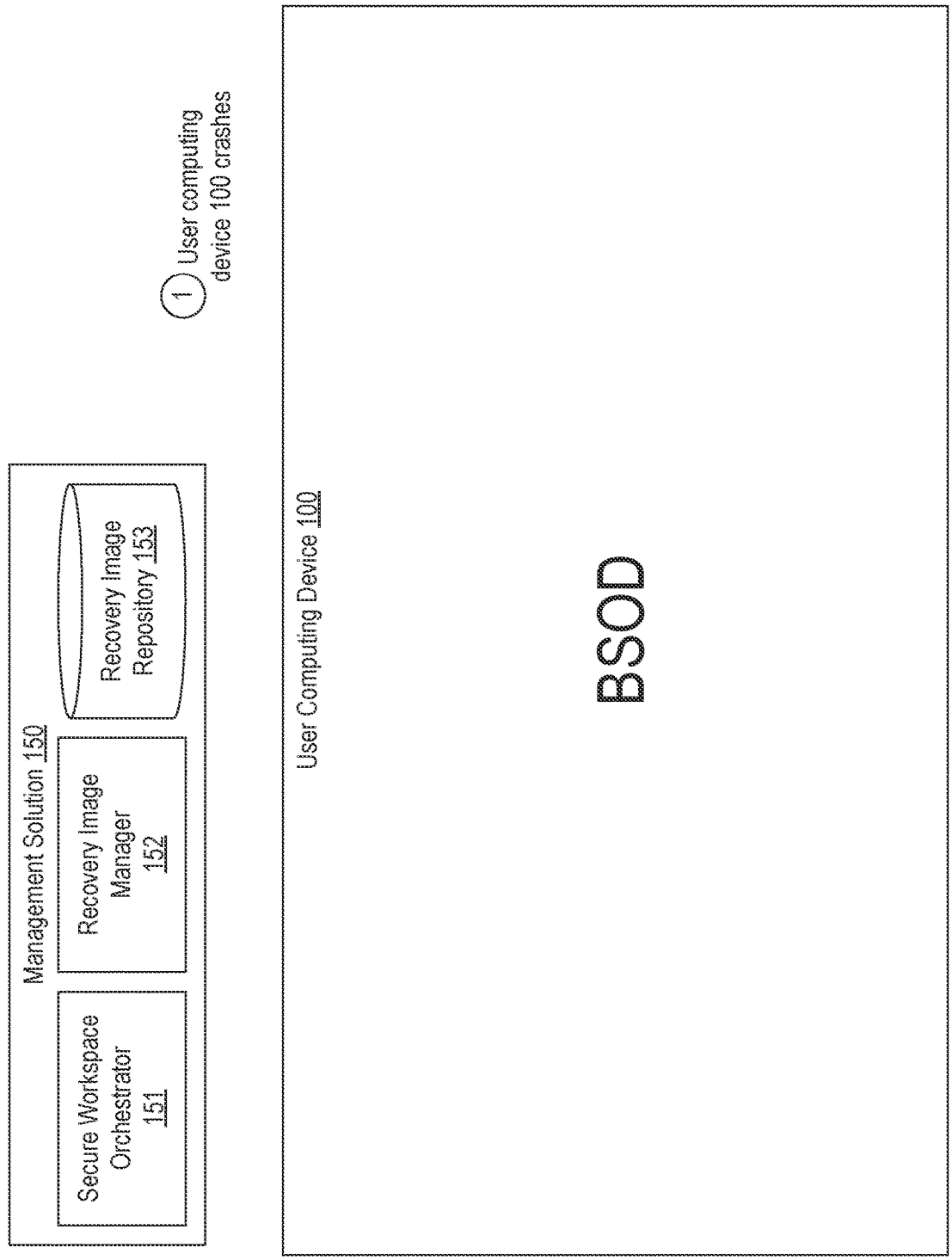
FIGS. 4A-4E provide an example of how end-to-end distributed recovery of a user computing device on which secure workspaces are deployed can be performed in accordance with one or more embodiments of the present invention.

Turning to FIG. 4A, in step 1, it is assumed that user computing device 100 crashes (e.g., a blue screen of death (BSOD)). As a result, operating system 115 may no longer be bootable. Alternatively, a drive of user computing device 100 containing operating system 115 or another hardware component of user computing device 100 could fail.

Figure 4B:
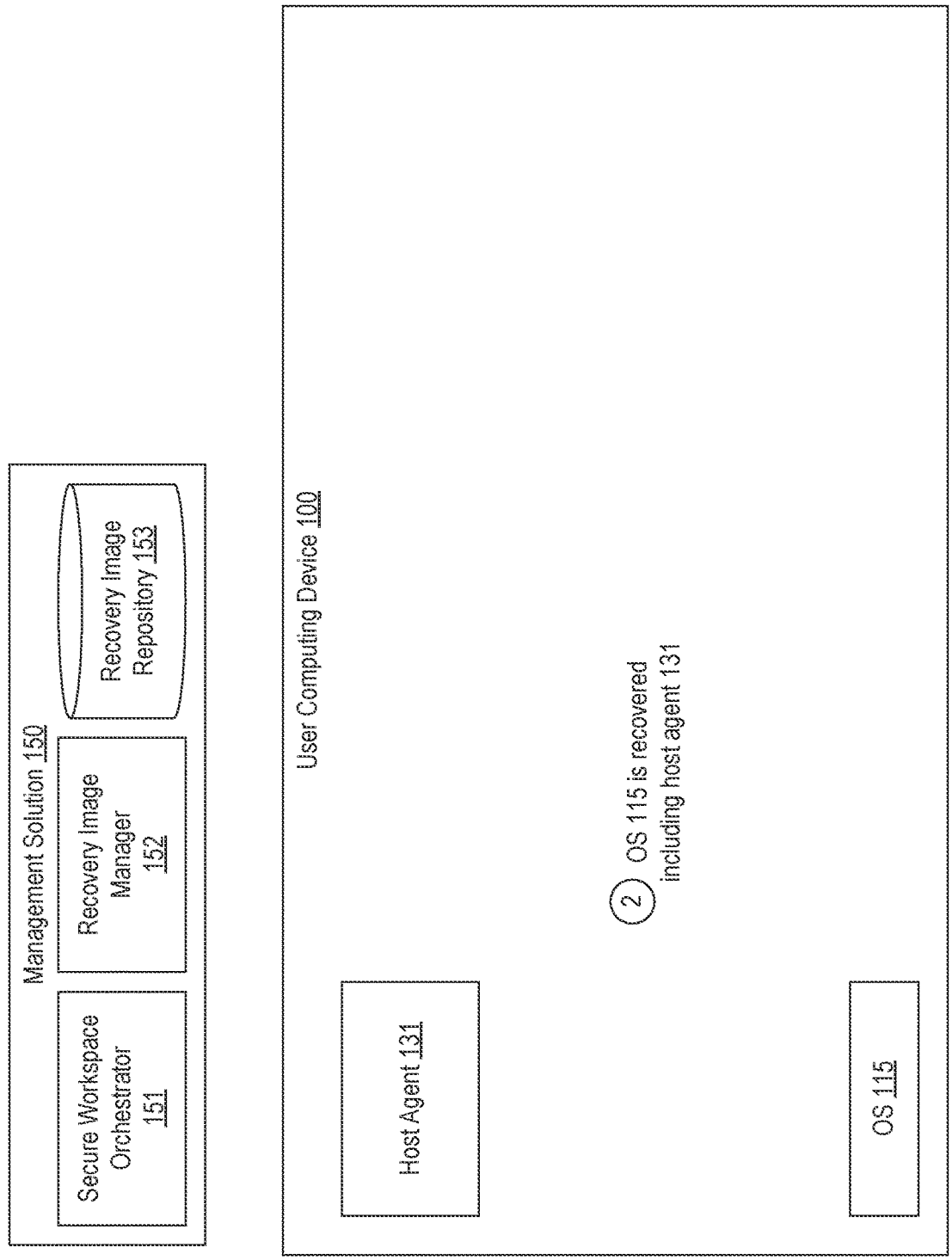

Turning to FIG. 4B, in step 2, it is assumed that operating system 115 is recovered and that this recovery includes host agent 131. This recovery of operating system 115 could be performed in any suitable way. Of importance is that the recovery of operating system 115 allows host agent 131 to resume running on user computing device 100. Notably, after this recovery of operating system 115, other components that had been present on user computing device 100, such as secure workspace manager(s) 110 and the secure workspaces, are no longer present.

Figure 4C:
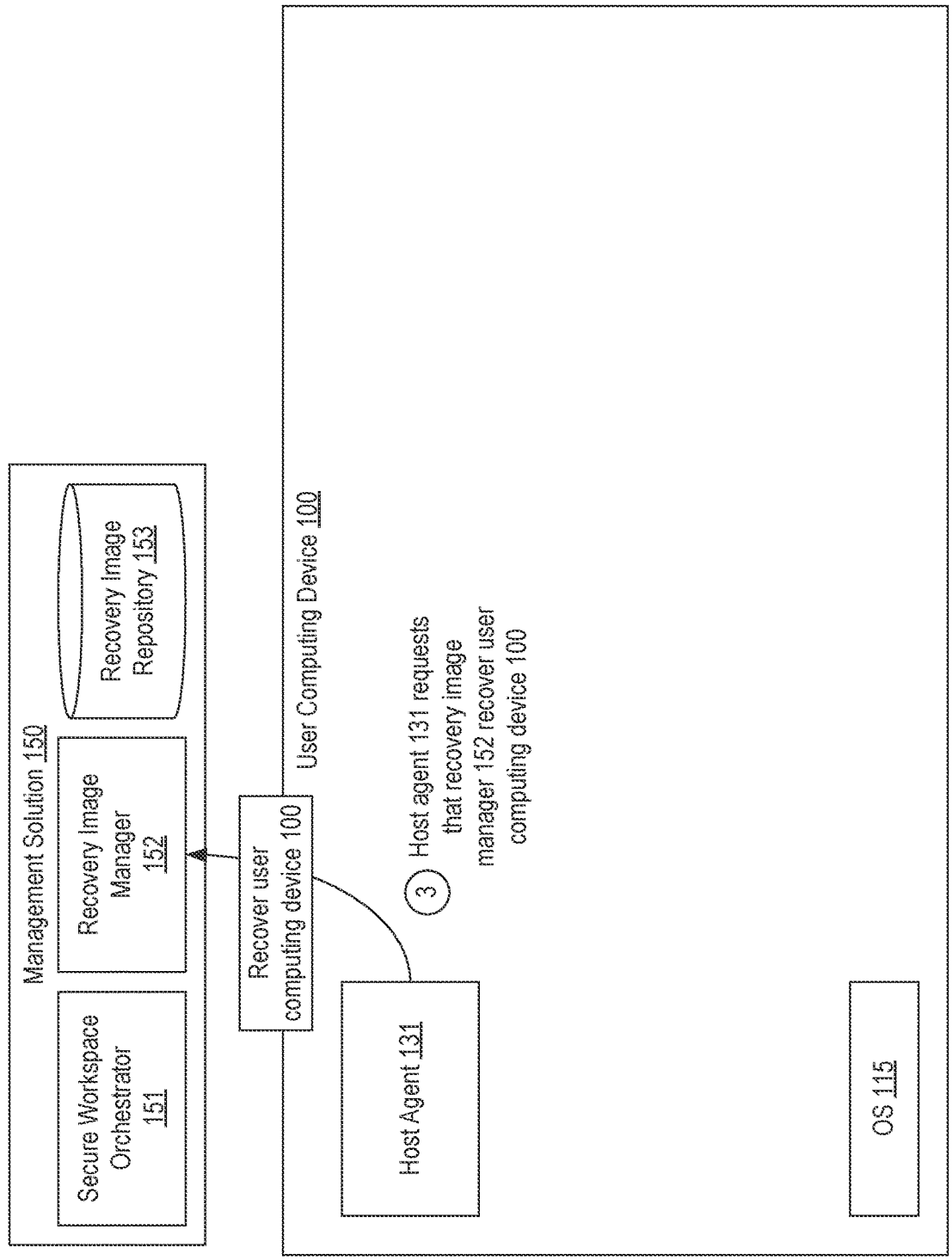

Turning to FIG. 4C, in step 3, host agent 131 can submit a request to recovery image manager 152 to request recovery of user computing device 100. For example, host agent 131 could provide an identifier of user computing device 100 and/or an identifier of the user of user computing device 100.

Figure 4D:
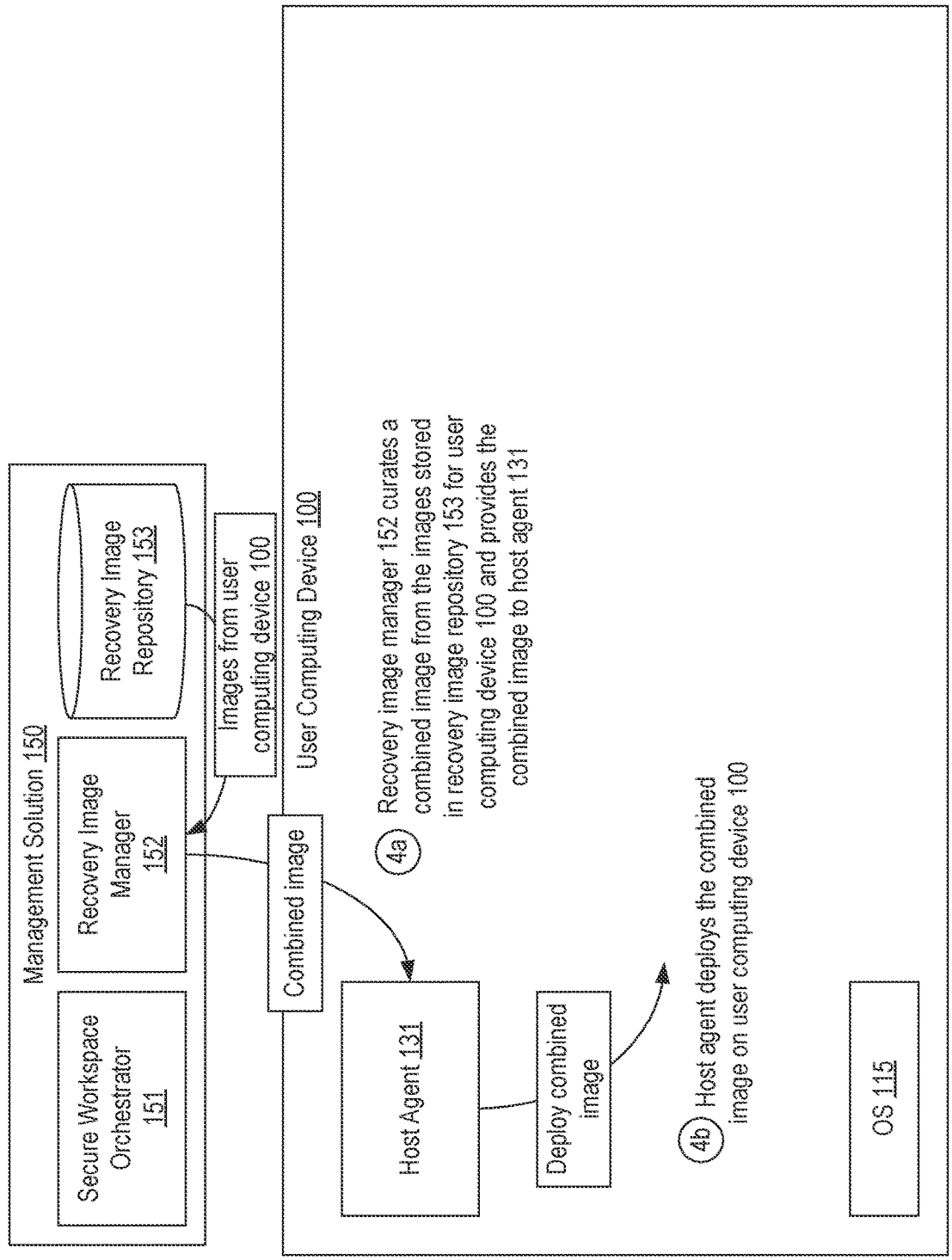

Turning to FIG. 4D, in step 4a, recovery image manager 152 can curate a combined image from the images stored in recovery image repository 153 for user computing device 100 and provide the combine image to host agent 131. For example, with reference to FIG. 3, recovery image manager 152 could retrieve each image in the recovery image collection for user computing device 100 and create a combined image from these images so that the combined image includes operating system 115, secure workspace manager(s) 110, host agent 131, and the images of secure workspaces 120-1, 120-2, 120-3, and 120-4, among possibly other components that were present in user computing device 100 when the images were created. In step 4b, host agent 131 can deploy the combined image on user computing device 100.

Figure 4E:
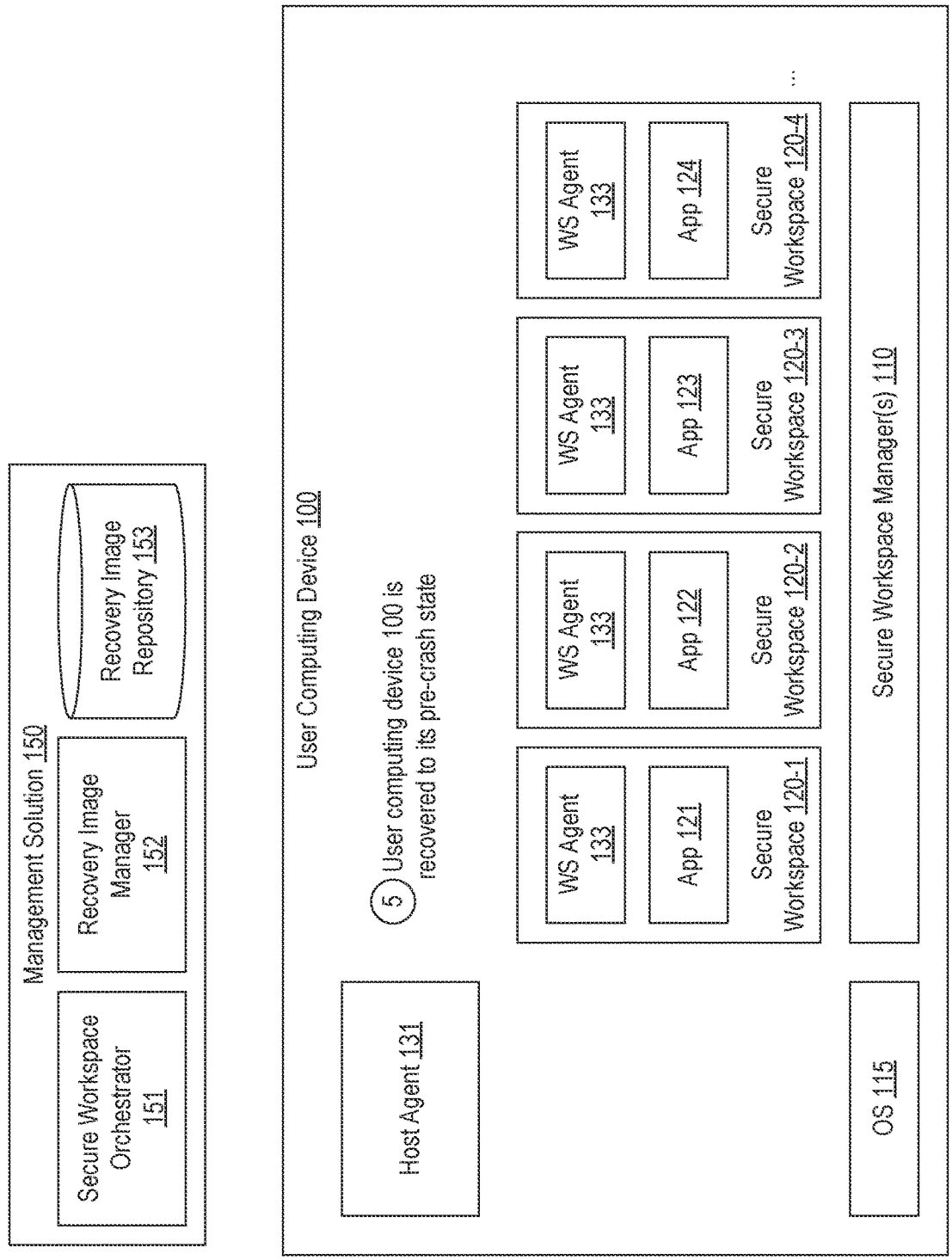

Turning to FIG. 4E, and as represented as step 5, the deployment of the combined image has cause user computing device 100 to be recovered to its pre-crash state (or more accurately, to the state that is represented in the images that were used to create the combined image). In this way, user computing device 100 including the secure workspaces deployed thereon are recovered.

Figure 5:
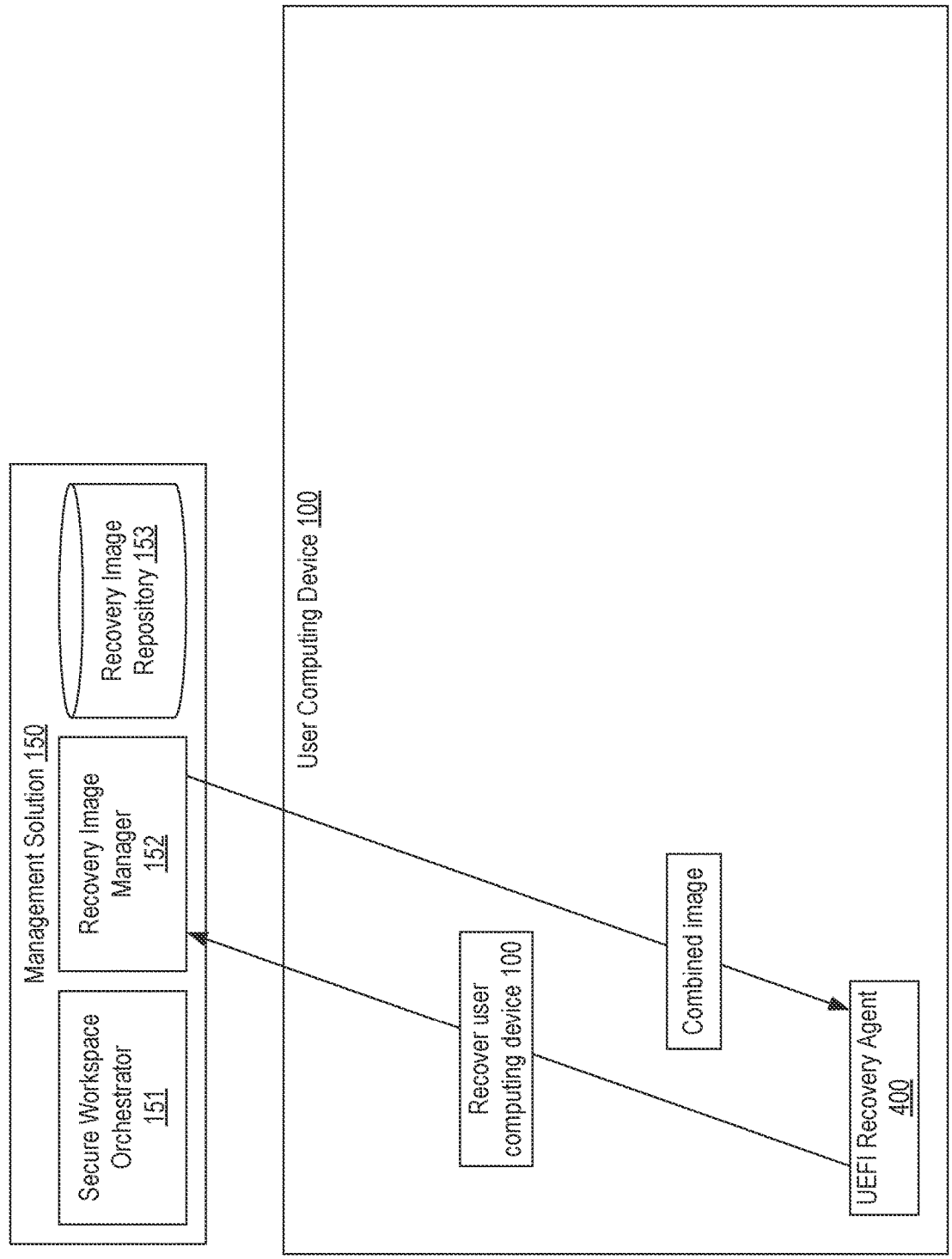
FIG. 5 provides an example of how a UEFI recovery agent may be used to implement end-to-end distributed recovery of a user computing device on which secure workspaces are deployed in accordance with one or more embodiments of the present invention.

FIG. 5 represents a variation in the above-described functionality. In this variation, a UEFI recovery agent 400 interfaces with recovery image manager 152 to obtain and deploy the combined image on user computing device 100. In such embodiments, the recovery from the combined image can be performed without first recovering operating system 115.

Figure 6:
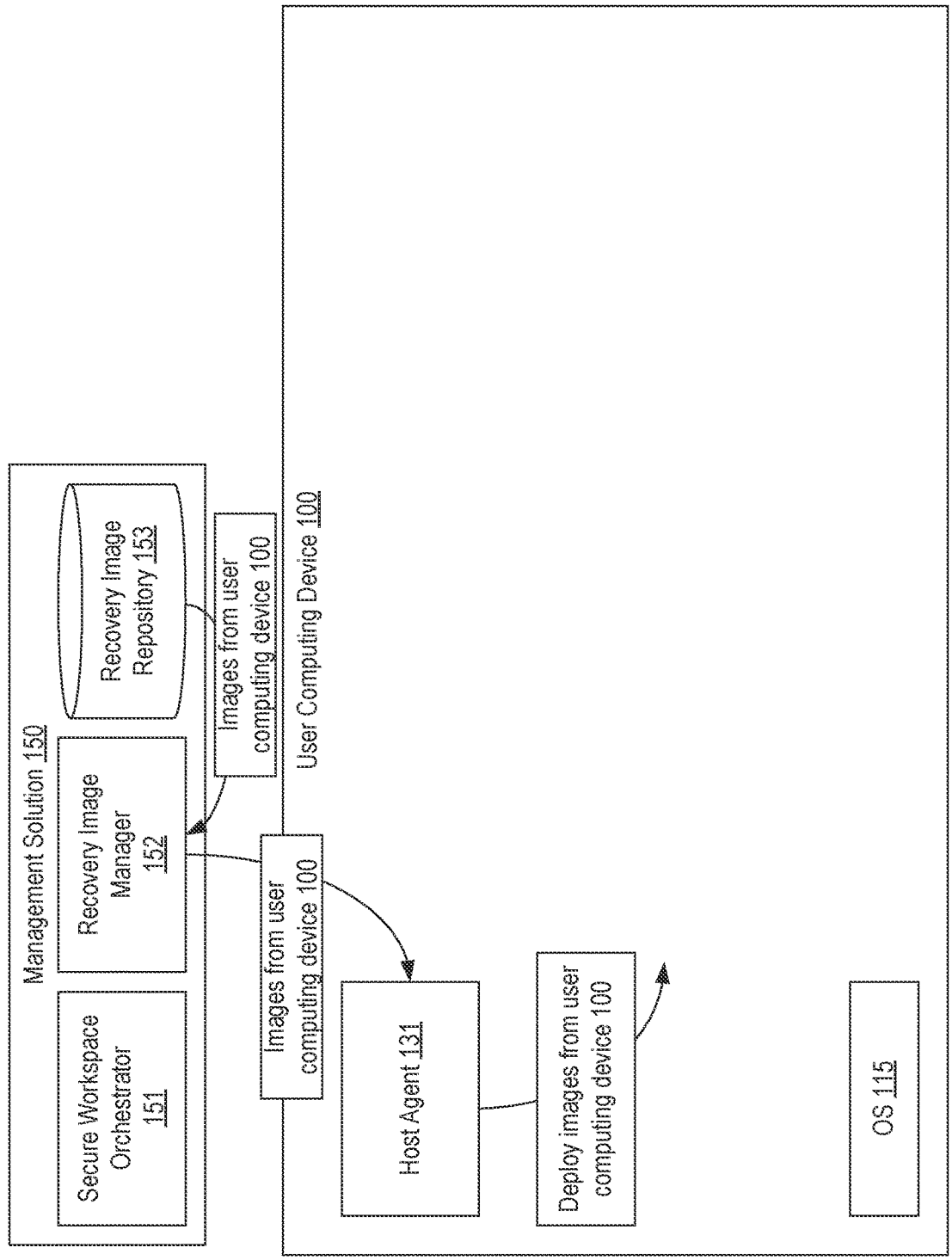
FIG. 6 provides another example of how end-to-end distributed recovery of a user computing device on which secure workspaces are deployed can be performed in accordance with one or more embodiments of the present invention.

FIG. 6 represents another variation of the above-described functionality. In this variation, host agent 131 retrieves the images from user computing device 100 that are stored in recovery image repository 153 and creates the combined image. Host agent 131 can then deploy the combined image to recover user computing device 100. In some embodiments, recovery image manager 152 may be configured to determine whether to create the combined image itself or provide the images to host agent 131 to allow host agent 131 to create the combined image. In such embodiments, recovery image manager 152 may base this decision on resources and/or capabilities of user computing device 100 (e.g., its CPU, RAM, recovery partition free space, network bandwidth, etc.) and/or resources and/or capabilities of recovery image manager 152 (e.g., storage costs, CPU/RAM utilization, etc.).

In summary, embodiments of the present invention enable end-to-end distributed recovery of a user computing device on which secure workspaces are deployed. By obtaining and storing images of the user computing device and of the secure workspaces deployed on the user computing device, a combined image can be curated and deployed to quickly recover the user computing device to a pre-crash state.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for end-to-end distributed recovery of a user computing device on which secure workspaces are deployed, the method comprising:
creating an image of a user computing device on which secure workspaces are deployed;
creating images of the secure workspaces;
storing the image of the user computing device and the images of the secure workspace;
in response to a crash of the user computing device, obtaining a combined image created from the image of the user computing device and the images of the secure workspace; and
deploying the combined image to recover the user computing device including the secure workspaces.

2. The method of claim 1, wherein the image of the user computing device includes one or more secure workspace managers.

3. The method of claim 1, wherein each of the images of the secure workspaces includes one or more applications.

4. The method of claim 1, wherein each of the images of the secure workspaces includes one or more policies.

5. The method of claim 1, wherein the image of the user computing device includes a host agent.

6. The method of claim 1, wherein creating the images of the secure workspaces comprises interfacing with workspace agents that execute in the secure workspaces.

7. The method of claim 1, wherein a recovery image manager of a management solution stores the image of the user computing device and the images of the secure workspace in a recovery image repository.

8. The method of claim 7, wherein the recovery image manager creates the combined image.

9. The method of claim 7, wherein the recovery image manager provides the image of the user computing device and the images of the secure workspace to a host agent on the user computing device, and the host agent creates the combined image.

10. The method of claim 9, wherein the recovery image manager selectively provides the image of the user computing device and the images of the secure workspace to the host agent based on resources or capabilities of the user computing device.

11. The method of claim 1, wherein a UEFI recovery agent obtains and deploys the combined image.

12. The method of claim 1, wherein the image of the user computing device and the images of the secure workspaces are periodically created and stored.

13. One or more computer storage media storing computer executable instructions which when executed implement a method for end-to-end distributed recovery of a user computing device on which secure workspaces are deployed, the method comprising:
creating, by a host agent running on a user computing device, an image of the user computing device on which secure workspaces are deployed;
creating, by workspace agents running in the secure workspaces, images of the secure workspaces;
providing, by the host agent, the image of the user computing device and the images of the secure workspaces to a recovery image manager of a management solution;
storing, by the recovery image manager, the image of the user computing device and the images of the secure workspace in a recovery image repository;
in response to a crash of the user computing device, obtaining a combined image created from the image of the user computing device and the images of the secure workspace; and
deploying the combined image to recover the user computing device including the secure workspaces.

14. The computer storage media of claim 13, wherein the recovery image manager creates the combined image.

15. The computer storage media of claim 13, wherein the host agent creates the combined image.

16. The computer storage media of claim 13, wherein a UEFI recovery agent obtains and deploys the combined image.

17. The computer storage media of claim 13, wherein each of the images of the secure workspaces includes one or more applications.

18. The computer storage media of claim 13, wherein at least one of the images of the secure workspaces includes policies for at least one application.

* * * * *